US012027108B1

(12) United States Patent
Wu et al.

(10) Patent No.: US 12,027,108 B1
(45) Date of Patent: Jul. 2, 2024

(54) DISPLAY DEVICE AND OPERATING METHOD THEREOF

(71) Applicant: AUO Corporation, Hsin-Chu (TW)

(72) Inventors: Yueh-Chi Wu, Hsin-Chu (TW); Shu-Wen Liao, Hsin-Chu (TW); Ti-Kuei Yu, Hsin-Chu (TW); Ya-Ling Hsu, Hsin-Chu (TW); Sheng-Yen Cheng, Hsin-Chu (TW); Yueh-Hung Chung, Hsin-Chu (TW)

(73) Assignee: AUO CORPORATION, Hsin-Chu (TW)

( * ) Notice: Subject to any disclaimer, the term of this patent is extended or adjusted under 35 U.S.C. 154(b) by 0 days.

(21) Appl. No.: 18/348,708

(22) Filed: Jul. 7, 2023

(30) Foreign Application Priority Data

Jan. 12, 2023 (TW) ................................ 112101405

(51) Int. Cl.
*G09G 3/32* (2016.01)

(52) U.S. Cl.
CPC ....... *G09G 3/32* (2013.01); *G09G 2310/0267* (2013.01); *G09G 2310/0275* (2013.01)

(58) Field of Classification Search
CPC ... G09G 2310/0275; G09G 2310/0267; G09G 3/32
See application file for complete search history.

(56) References Cited

U.S. PATENT DOCUMENTS

| | | | | |
|---|---|---|---|---|
| 2012/0105784 A1* | 5/2012 | Ho | .................... G02F 1/136286 349/139 |
| 2020/0363890 A1 | 11/2020 | Wang | |
| 2021/0116767 A1 | 4/2021 | Qian | |
| 2023/0209953 A1* | 6/2023 | Jo | ........................ H10K 59/121 257/40 |
| 2024/0021121 A1* | 1/2024 | Tian | ..................... G09G 3/3266 |

FOREIGN PATENT DOCUMENTS

| | | |
|---|---|---|
| CN | 105372891 A | 3/2016 |
| CN | 113257130 A | 8/2021 |

* cited by examiner

*Primary Examiner* — Muhammad N Edun
(74) *Attorney, Agent, or Firm* — WPAT, P.C

(57) ABSTRACT

A display device includes first and second pixel circuits, first and second gate lines, and first and second transmission lines. The first pixel circuit emits light according to a data signal, and is charged according to a first gate signal. The second pixel circuit emits light according to the data signal, and is charged according to a second gate signal. The first gate line is located between the first second pixel circuits, and provides the first gate signal. The second gate line provides the second gate signal. The first transmission line provides the second gate signal to the second gate line. The second transmission line is located between the first transmission line and the second pixel circuit, crosses over the second gate line, and provides the first gate signal to the first gate line.

20 Claims, 8 Drawing Sheets

DISPLAY DEVICE AND OPERATING METHOD THEREOF

CROSS-REFERENCE TO RELATED APPLICATION

This application claims priority to Taiwan Application Serial Number 112101405, filed Jan. 12, 2023, which is herein incorporated by reference in its entirety.

BACKGROUND

Technical Field

The present disclosure relates to a display technique. More particularly, the present disclosure relates to a display device and an operating method of a display device.

Description of Related Art

Pixel circuits in a display device perform light emitting operations according to corresponding gate signals. However, capacitive coupling between gate lines of the gate signals and the pixel circuits and the data lines may cause brightness abnormal of the display device. Thus, techniques associated with the development for overcoming the problems described above are important issues in the field.

SUMMARY

The present disclosure provides a display device. The display device includes a first pixel circuit, a second pixel circuit, a first gate line, a second gate line, a first transmission line and a second transmission line. The first pixel circuit is configured to emit light according to a data signal, and is configured to be charged according to a first gate signal. The second pixel circuit is configured to emit light according to the data signal, and is configured to be charged according to a second gate signal. The first gate line is located between the first pixel circuit and the second pixel circuit, and is configured to provide the first gate signal. The second gate line is configured to provide the second gate signal. The first transmission line is configured to provide the second gate signal to the second gate line. The second transmission line is located between the first transmission line and the second pixel circuit, crosses over the second gate line, and is configured to provide the first gate signal to the first gate line.

The present disclosure provides an operating method of a display device. The operating method includes transmitting a data signal to each of a first pixel circuit and a second pixel circuit; transmitting a first gate signal through a first gate line to the first pixel circuit; transmitting a second gate signal through a second gate line to the second pixel circuit; transmitting the second gate signal through a first transmission line to the second gate line; and transmitting the first gate signal through a second transmission line to the first gate line. The first pixel circuit, the first gate line, the second pixel circuit, the second gate line are arranged in order, and the second transmission line is located between the first transmission line and the second pixel circuit, and crosses over the second gate line.

The present disclosure provides an operating method of a display device. The operating method includes transmitting a data signal to each of a first pixel circuit and a second pixel circuit; transmitting a first gate signal through a first gate line to the first pixel circuit; transmitting a second gate signal through a second gate line to the second pixel circuit; transmitting the second gate signal through a first transmission line to the second gate line; and transmitting the first gate signal through a second transmission line to the first gate line. The first pixel circuit, the first gate line, the second pixel circuit, the second gate line are arranged in order, and the second transmission line is located between the first transmission line and the second pixel circuit, and crosses over the second gate line.

It is to be understood that both the foregoing general description and the following detailed description are examples, and are intended to provide further explanation of the disclosure as claimed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
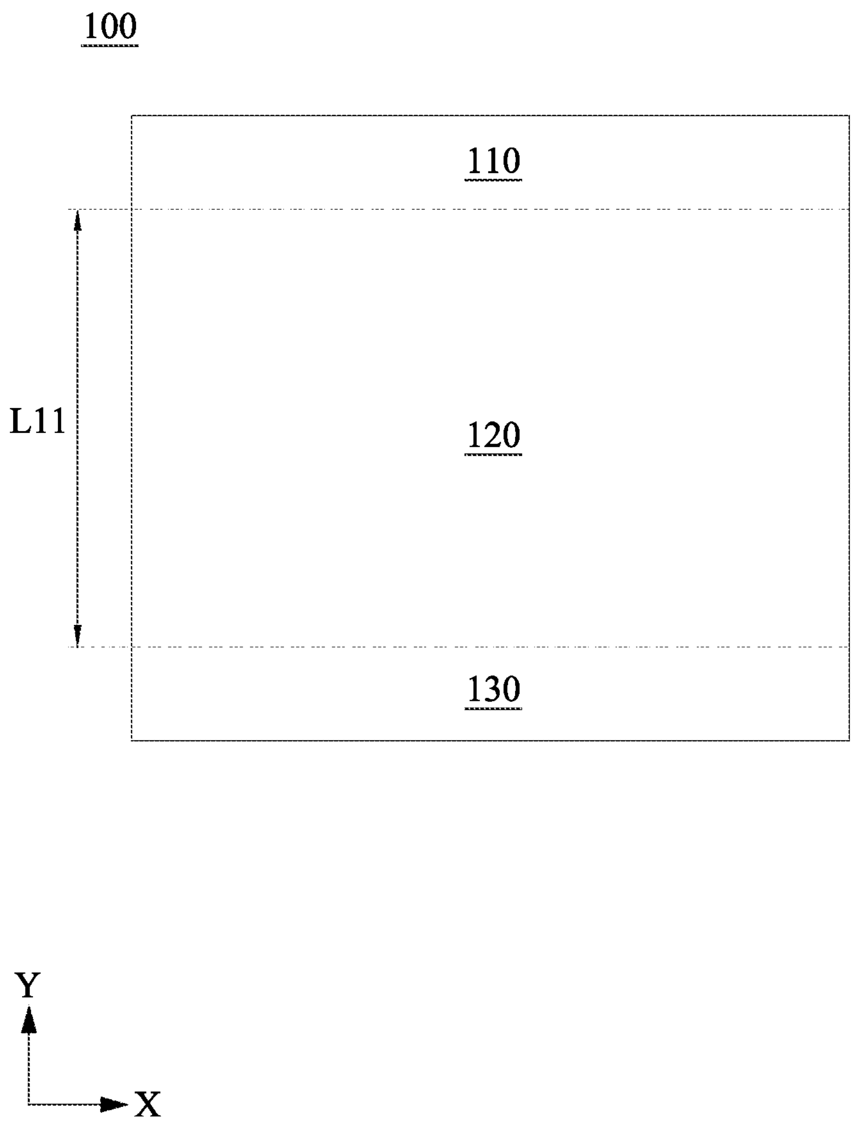
FIG. 1 is a schematic diagram of a display device illustrated according to one embodiment of present disclosure.

In the present disclosure, when an element is referred to as “connected” or “coupled”, it may mean “electrically connected” or “electrically coupled”. “Connected” or “coupled” can also be used to indicate that two or more components operate or interact with each other. In addition, although the terms “first”, “second”, and the like are used in the present disclosure to describe different elements, the terms are used only to distinguish the elements or operations described in the same technical terms. The use of the term is not intended to be a limitation of the present disclosure.

Unless otherwise defined, all terms (including technical and scientific terms) used in the present disclosure have the same meaning as commonly understood by the ordinary skilled person to which the concept of the present invention belongs. It will be further understood that terms (such as those defined in commonly used dictionaries) should be interpreted as having a meaning consistent with its meaning in the related technology and/or the context of this specification and not it should be interpreted in an idealized or overly formal sense, unless it is clearly defined as such in this article.

The terms used in the present disclosure are only used for the purpose of describing specific embodiments and are not intended to limit the embodiments. As used in the present disclosure, the singular forms "a", "one" and "the" are also intended to include plural forms, unless the context clearly indicates otherwise. It will be further understood that when used in this specification, the terms "comprises (comprising)" and/or "includes (including)" designate the existence of stated features, steps, operations, elements and/or components, but the existence or addition of one or more other features, steps, operations, elements, components, and/or groups thereof are not excluded.

Hereinafter multiple embodiments of the present disclosure will be disclosed with schema, as clearly stated, the details in many practices it will be explained in the following description. It should be appreciated, however, that the details in these practices is not applied to limit the present disclosure. Also, it is to say, in some embodiments of the present disclosure, the details in these practices are non-essential. In addition, for the sake of simplifying schema, some known usual structures and element in the drawings by a manner of simply illustrating for it.

FIG. 1 is a schematic diagram of a display device illustrated according to one embodiment of present disclosure. As illustratively shown in FIG. 1, the display device 100 includes boundary regions 110, 130 and light emitting region 120. The boundary region 130, the light emitting region 120 and the boundary region 110 are arranged in order along a Y direction. The light emitting region 120 has a length L11 along the Y direction.

In some embodiments, the display device 100 further includes various circuits, such as light emitting circuits and control circuits. The control circuits are configured to generate data signals (such as data signals DT1 and DT2 shown in FIG. 2). The light emitting circuits are configured to emit light according to the data signals. In some embodiments, the light emitting circuits are located at the light emitting region 120, and the control circuits are located at the boundary regions 110 and/or 130. In some embodiments, the circuits located at the boundary regions 110 or 130 do not emit light.

Figure 2:
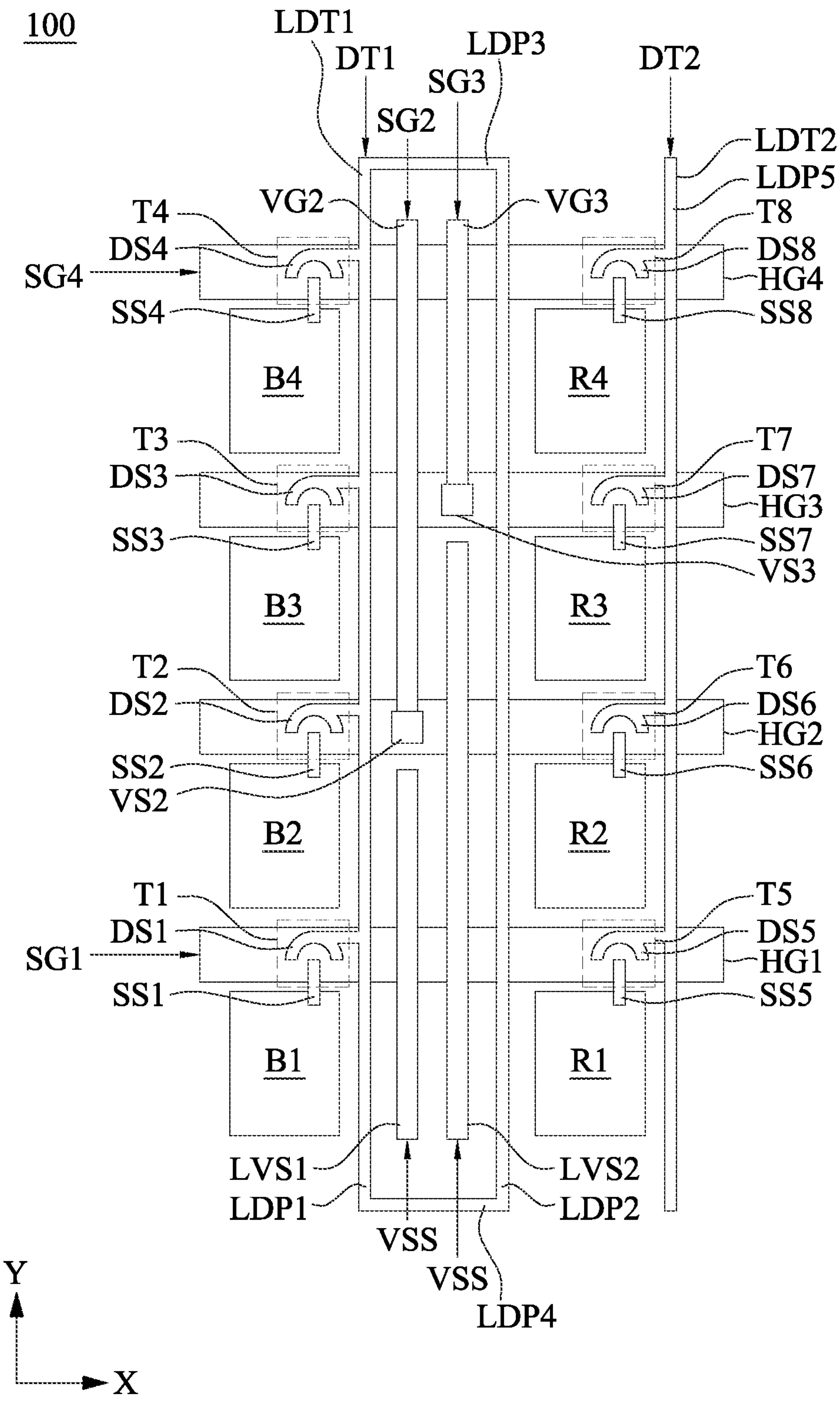
FIG. 2 is a schematic diagram of further details of the display device shown in FIG. 1, illustrated according to one embodiment of present disclosure.

FIG. 2 is a schematic diagram of further details of the display device 100 shown in FIG. 1, illustrated according to one embodiment of present disclosure. As illustratively shown in FIG. 2, the display device 100 includes gate lines HG1-HG4, transmission lines VG2, VG3, data lines LDT1, LDT2, reference voltage lines LVS1, LVS2, via structures VS2, VS3, source structures SS1-SS8 and pixel circuits B1-B4, R1-R4.

As illustratively shown in FIG. 2, each of the gate lines HG1-HG4 extends along an X direction, and the gate lines HG1-HG4 are arranged in order along a Y direction. In some embodiments, the X direction is perpendicular with the Y direction.

As illustratively shown in FIG. 2, the transmission line VG2 extends along the Y direction, and crosses over the gate lines HG3 and HG4. The transmission line VG3 extends along the Y direction, and crosses over the gate line HG4. The reference voltage line LVS1 extends along the Y direction, and crosses over the gate line HG1. The reference voltage line LVS2 extends along the Y direction, and crosses over the gate lines HG1 and HG2.

In some embodiments, the reference voltage lines LVS1 and LVS2 are configured to provide the reference voltage signal VSS to at least one of the pixel circuits B1-B4 and R1-R4. In some embodiments, the reference voltage signal VSS has a fixed voltage value, such that the reference voltage lines LVS1 and LVS2 do not have capacitive coupling with other elements.

As illustratively shown in FIG. 2, the via structure VS2 is located above the gate line HG2, and is configured to couple the gate line HG2 and the transmission line VG2, such that the gate line HG2 and the transmission line VG2 have the same voltage level. The via structure VS3 is located above the gate line HG3, and is configured to couple the gate line HG3 and the transmission line VG3, such that the gate line HG3 and the transmission line VG3 have the same voltage level.

As illustratively shown in FIG. 2, along the Y direction, the pixel circuits B1-B4 are arranged in order, and the pixel circuits R1-R4 are arranged in order. Each of the pixel circuits B2 and R2 are located between the gate lines HG1 and HG2. Each of the pixel circuits B3 and R3 are located between the gate lines HG2 and HG3. Each of the pixel circuits B4 and R4 are located between the gate lines HG3 and HG4.

As illustratively shown in FIG. 2, the source structure SS1 is coupled to each of the gate line HG1 and the pixel circuit B1. The source structure SS2 is coupled to each of the gate line HG2 and the pixel circuit B2. The source structure SS3 is coupled to each of the gate line HG3 and the pixel circuit B3. The source structure SS4 is coupled to each of the gate line HG4 and the pixel circuit B4. The source structure SS5 is coupled to each of the gate line HG1 and the pixel circuit R1. The source structure SS6 is coupled to each of the gate line HG2 and the pixel circuit R2. The source structure SS7 is coupled to each of the gate line HG3 and the pixel circuit R3. The source structure SS8 is coupled to each of the gate line HG4 and the pixel circuit R4.

As illustratively shown in FIG. 2, the data line LDT1 includes data line portions LDP1-LDP4 and drain structure DS1-DS4. The drain structures DS1-DS4 are located above the gate lines HG1-HG4, respectively. Along the X direction, each of the data line portions LDP1-LDP4 is located between two columns of pixel circuits. For example, in the embodiment shown in FIG. 2, each of the data line portions LDP1-LDP4 is located between a column including the pixel circuits B1-B4 and another column including the pixel circuits R1-R4.

As illustratively shown in FIG. 2, each of the data line portions LDP1 and LDP2 extends along the Y direction, and crosses over each of the gate lines HG1-HG4. Along the X direction, the data line portion LDP1, the transmission line VG2, VG3 and the data line portion LDP2 are arranged in order. In some embodiments, a distance between the transmission line VG2 and the data line portion LDP1 is smaller than a distance between the transmission line VG2 and the data line portion LDP2, and a distance between the transmission line VG3 and the data line portion LDP2 is smaller than a distance between the transmission line VG3 and the data line portion LDP1.

As illustratively shown in FIG. 2, each of the data line portions LDP3 and LDP4 extends along the X direction. The data line portion LDP3 is configured to couple a terminal of the data line portion LDP1 and a terminal of the data line portion LDP2, and the data line portion LDP3 is configured to couple another terminal of the data line portion LDP1 and another terminal of the data line portion LDP2. Along the Y direction, each of the gate line HG1-HG4 is located between the data line portions LDP3 and LDP4.

In some alternative embodiments, the data line LDT1 may not include the data line portion LDP4. In the embodiments described above, the data line portions LDP1 and LDP2 are coupled to each other merely by the data line portion LDP3.

Referring to FIG. 2 and FIG. 1, in some embodiments, the data line portions LDP3 and LDP4 are located at the boundary regions 110 and 130, respectively. A terminal of each of the data line portions LDP1 and LDP2 is located at the boundary region 110, and another terminal of each of the data line portions LDP1 and LDP2 is located at the boundary region 130. A length of each of the data line portions LDP1 and LDP2 along the Y direction is longer than the length L11.

As illustratively shown in FIG. 2, the data line LDT2 includes data line portions LDP5 and drain structures DS5-DS8. The drain structures DS5-DS8 are located above the gate lines HG1-HG4, respectively. The data line portion LDP5 extends along the Y direction, and crosses over each of the gate lines HG1-HG4.

In some embodiments, the gate lines HG1-HG4, the drain structure DS1-DS8 and the source structures SS1-SS8 are configured to operate as corresponding transistors. As illustratively shown in FIG. 2, the gate line HG1, the drain structure DS1 and the source structure SS1 correspond to a transistor T1. The gate line HG2, the drain structure DS2 and the source structure SS2 correspond to a transistor T2. The gate line HG3, the drain structure DS3 and the source structure SS3 correspond to a transistor T3. The gate line HG4, the drain structure DS4 and the source structure SS4 correspond to a transistor T4. The gate line HG1, the drain structure DS5 and the source structure SS5 correspond to a transistor T5. The gate line HG2, the drain structure DS6 and the source structure SS6 correspond to a transistor T6. The gate line HG3, the drain structure DS7 and the source structure SS7 correspond to a transistor T7. The gate line HG4, the drain structure DS8 and the source structure SS8 correspond to a transistor T8.

In some embodiments, the transmission line VG2 is configured to transmit the gate signal SG2 through the via structure VS2 to the gate line HG2. The transmission line VG3 is configured to transmit the gate signal SG3 through the via structure VS3 to the gate line HG3. In some embodiments, the gate line HG1 is configured to receive the gate signal SG1 from a transmission line other than the transmission lines VG2 and VG3. The gate line HG4 is configured to receive the gate signal SG4 from a transmission line other than the transmission lines VG2 and VG3.

In some embodiments, the data lines LDT1 and LDT2 are configured to receive the data signals DT1 and DT2, respectively. The transistor T1 is configured to provide the data signal DT1 to the pixel circuit B1 according to the gate signal SG1. The transistor T2 is configured to provide the data signal DT1 to the pixel circuit B2 according to the gate signal SG2. The transistor T3 is configured to provide the data signal DT1 to the pixel circuit B3 according to the gate signal SG3. The transistor T4 is configured to provide the data signal DT1 to the pixel circuit B4 according to the gate signal SG4. Each of the pixel circuit B1-B4 is configured to emit light according to the data signal DT1.

In some embodiments, the data line LDT1 and each of the transmission lines VG2 and VG3 have capacitive coupling, such that the voltage level of the data signal DT1 is affected by the change of the variation of the gate signals SG2 and/or SG3.

In some embodiments, the transistor T5 is configured to provide the data signal DT2 to the pixel circuit R1 according to the gate signal SG1. The transistor T6 is configured to provide the data signal DT2 to the pixel circuit R2 according to the gate signal SG2. The transistor T7 is configured to provide the data signal DT2 to the pixel circuit R3 according to the gate signal SG3. The transistor T8 is configured to provide the data signal DT2 to the pixel circuit R4 according to the gate signal SG4. Each of the pixel circuit R1-R4 is configured to emit light according to the data signal DT2.

Figure 3:
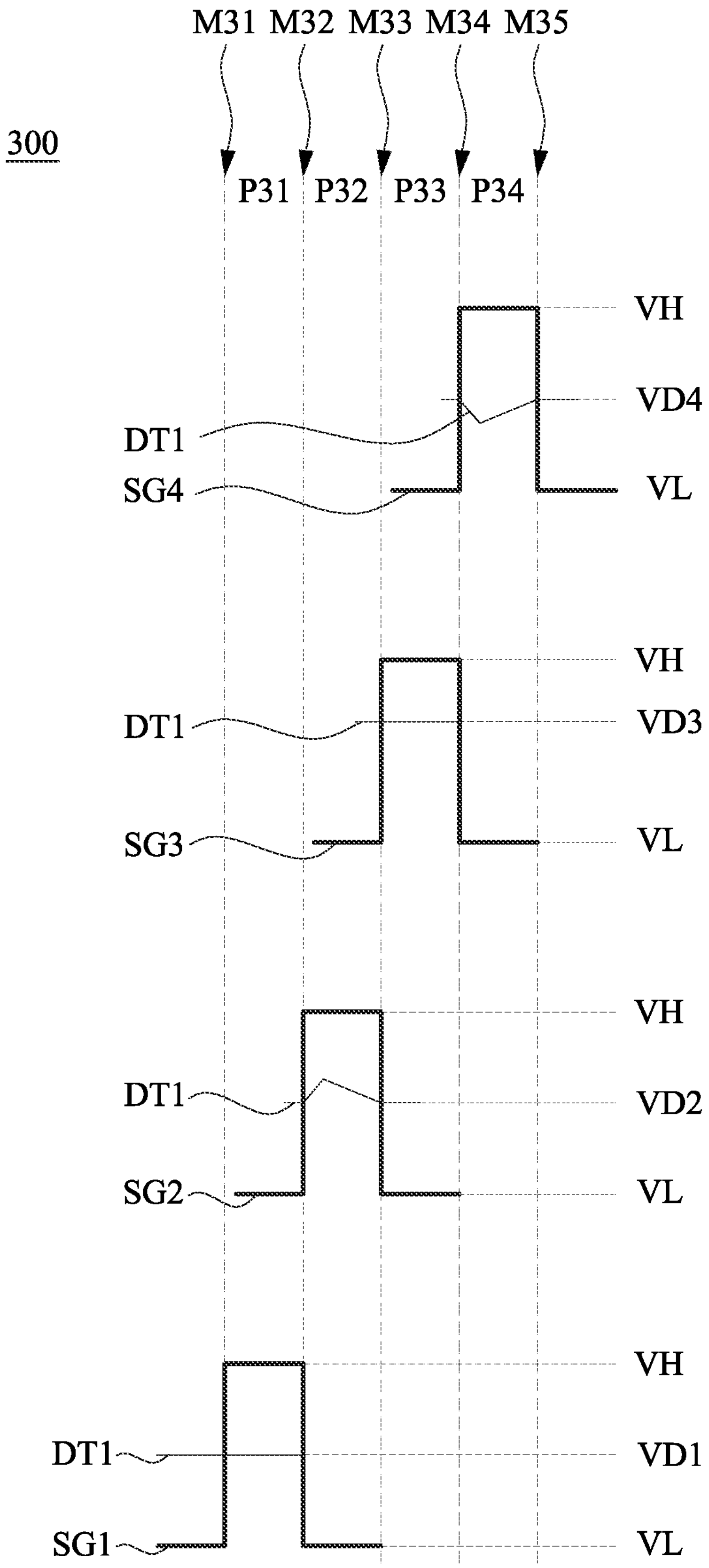
FIG. 3 is a timing diagram of operations of the display device shown in FIG. 1, illustrated according to one embodiment of present disclosure.

FIG. 3 is a timing diagram 300 of operations of the display device 100 shown in FIG. 1, illustrated according to one embodiment of present disclosure. As illustratively shown in FIG. 3, the timing diagram 300 includes periods P31-P34 arranged continuously in order. The period P31 starts at the moment M31, and ends at the moment M32. The period P32 starts at the moment M32, and ends at the moment M33. The period P33 starts at the moment M33, and ends at the moment M34. The period P34 starts at the moment M34, and ends at the moment M35.

As illustratively shown in FIG. 3, during the periods P31-P34, the gate signals SG1-SG4 are changed between the voltage levels VH and VL. The data signal DT1 has approximately the voltage levels VD1-VD4 during the periods P31-P34, respectively. In some embodiments, the voltage level VH is larger than the voltage level VL. Referring to FIG. 2 and FIG. 3, for each of the transistors T1-T8, the voltage level VL is a disable signal, and the voltage level VH is an enable signal. Alternatively stated, each of the transistors T1-T8 is turned off according to the voltage level VL, and is turned on according to the voltage level VH.

At the moment M31, the gate signal SG1 is changed from the voltage level VL to the voltage level VH, such that the pixel circuit B1 starts to be charged. In some embodiments, distances from the transmission line configured to transmit the gate signal SG1 to the gate line SG1 to the pixel circuits B1-B4 and the data line LDT1 are longer, such as having a width of two or more pixel circuits along the X direction, such that the voltage variation of the gate signal SG1 does not affect the voltage levels of the pixel circuits B1-B4 and the data line LDT1 through capacitive coupling. Accordingly, at the moment M31, the voltage levels of the pixel circuits B1-B4 and the data line LDT1 are remained unchanged.

During the period P31, the gate signal SG1 has the voltage level VH, such that each of the transistors T1 and T5 is turned on. At this time, the pixel circuit B1 is charged according to the data signal DT1 having the data voltage level VD1, and the pixel circuit R1 is charged according to the data signal DT2.

At the moment M32, the gate signal SG1 is changed from the voltage level VH to the voltage level VL, and the gate signal SG2 is changed from the voltage level VL to the voltage level VH, such that the pixel circuit B1 stops to be charged and the pixel circuit B2 starts to be charged. After the moment M32, the pixel circuit B1 emits light according to the data voltage level VD1.

In some embodiments, at the moment M32, the voltage level of the transmission line VG2 is pulled high by the gate signal SG2, and affects the voltage level of the data line portion LDP1 through capacitive coupling, such that the voltage level of the pixel circuit is pulled high.

During the period P32, the gate signal SG2 has the voltage level VH, such that each of the transistors T2 and T6 is turned on. At this time, the pixel circuit B2 is charged according to the data signal DT1 having the data voltage level VD2, and the pixel circuit R2 is charged according to the data signal DT2.

At the moment M33, the gate signal SG2 is changed from the voltage level VH to the voltage level VL, and the gate signal SG3 is changed from the voltage level VL to the voltage level VH, such that the pixel circuit B2 stops to be charged and the pixel circuit B3 starts to be charged. At this time, the voltage level of the transmission line VG2 is pulled low by the gate signal SG2, and pulls low the voltage level of the data line portion LDP1 through capacitive coupling. On the other hand, the voltage level of the transmission line VG3 is pulled high by the gate signal SG3, and pulls high the voltage level of the data line portion LDP2 through capacitive coupling. Accordingly, the pulling low of the gate signal SG2 and the pulling high of the gate signal SG3 cancel each other on the data line LDT1, such that the data line LDT1 is maintained at the voltage level VD2. At this time, the voltage level of the pixel circuit B2 coupled to the data line LDT1 is also remains unchanged. After the moment M33, the pixel circuit B2 emits light according to the data voltage level VD2.

During the period P33, the gate signal SG3 has the voltage level VH, such that each of the transistors T3 and T7 is turned on. At this time, the pixel circuit B3 is charged according to the data signal DT1 having the data voltage level VD3, and the pixel circuit R3 is charged according to the data signal DT2.

At the moment M34, the gate signal SG3 is changed from the voltage level VH to the voltage level VL, and the gate signal SG4 is changed from the voltage level VL to the voltage level VH, such that the pixel circuit B3 stops to be charged and the pixel circuit B4 starts to be charged. At this time, the transmission line VG3 does not have capacitive coupling with each of the pixel circuits B3 and B4, such that the pixel circuit B3 is maintained at the data voltage level VD3, and the pixel circuit B4 is affected less after the moment M34 when being charged. After the moment M34, the pixel circuit B3 emits light according to the data voltage level VD3.

In some embodiments, at the moment M34, the transmission line VG3 does not have capacitive coupling with each of the pixel circuits B3 and B4 is because of that a distance between the transmission line VG3 and each of the pixel circuits B3 and B4 is longer. For example, the distance between the transmission line VG3 and the pixel circuit B3 is larger than the distance between the transmission line VG2 and the pixel circuit B3. Accordingly, the capacitive coupling between the transmission line VG3 and the pixel circuit B3 is smaller than the capacitive coupling between the transmission line VG2 and the pixel circuit B3.

In some approaches, in a display device, transmission lines providing gate signals have bad arrangements, such that distances between the transmission lines and pixel circuits are smaller. Accordingly, when the pixel circuits perform charging operation, the capacitive coupling between the transmission lines and the pixel circuits occurs simultaneously with the capacitive coupling between the transmission lines and data lines, such that voltage levels of the pixel circuits are pulled low severely. As a result, issues of brightness abnormal are occurred on the display device.

Comparing to above approaches, in some embodiments of present disclosure, along the X direction, the pixel circuit B4, the data line portion LDP1 and the transmission lines VG2, VG3 are arranged in order, such that the distance between the transmission line VG3 and the pixel circuit B4 is longer. As a result, the voltage level of the pixel circuit B4 is not affected by the variation of the voltage level of the transmission line VG3. Accordingly, the issues of brightness abnormal of the display device 100 are reduced.

As illustratively shown in FIG. 3, during the period P34, the gate signal SG4 has the voltage level VH, such that each of the transistors T4 and T8 is turned on. At this time, the pixel circuit B4 is charged according to the data signal DT1 having the data voltage level VD4, and the pixel circuit R4 is charged according to the data signal DT2.

At the moment M35, the gate signal SG4 is changed from the voltage level VH to the voltage level VL, such that the pixel circuit B4 stops to be charged. After the moment M35, the pixel circuit B4 emits light according to the data voltage level VD4.

Figure 4:
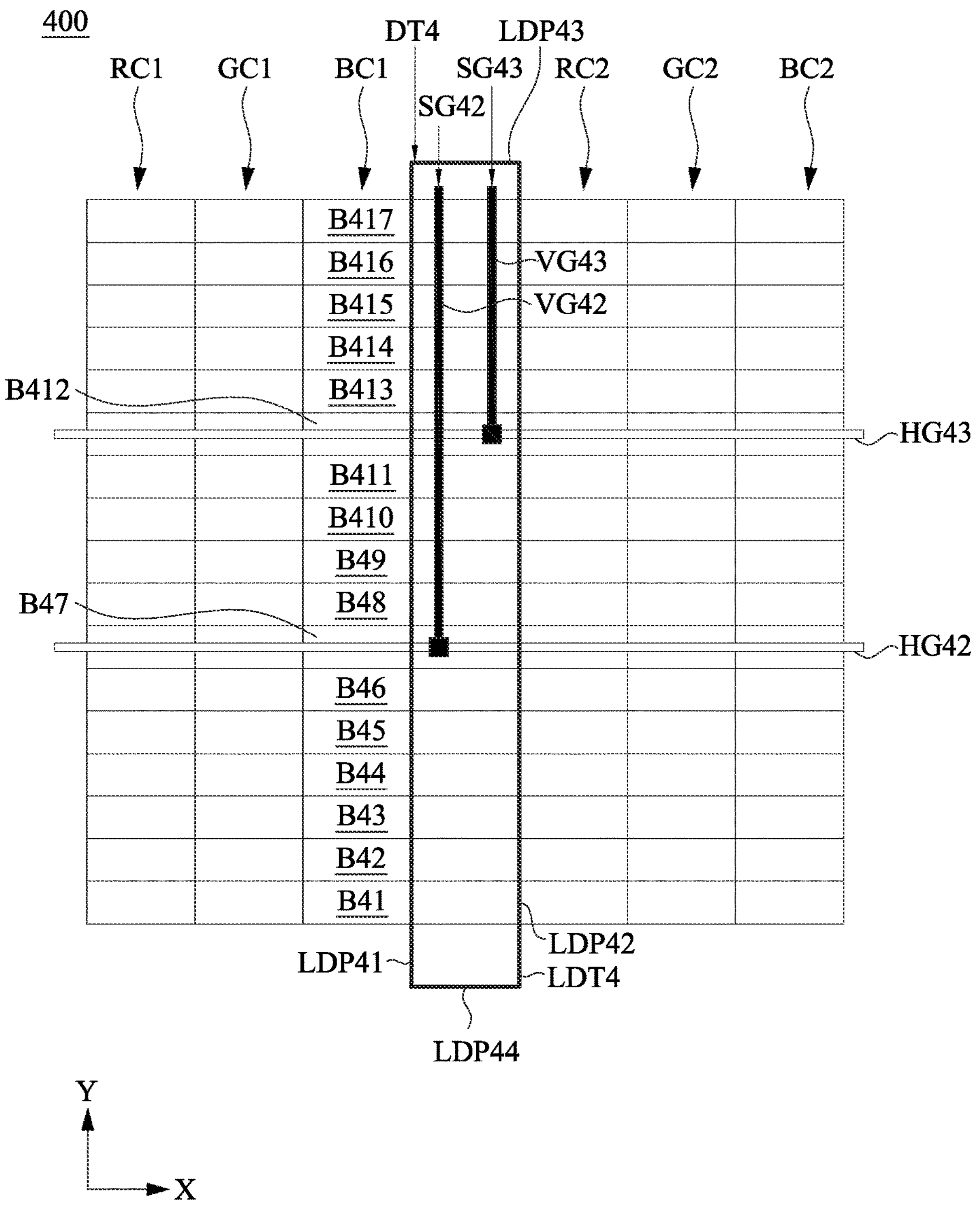
FIG. 4 is a schematic diagram of a display device illustrated according to one embodiment of present disclosure.

FIG. 4 is a schematic diagram of a display device 400 illustrated according to one embodiment of present disclosure. As illustratively shown in FIG. 4, the display device 400 includes gate lines HG42, HG43, transmission lines VG42, VG43, a data line LDT4 and pixel circuit columns RC1, GC1, BC1, RC2, GC2, BC2.

In some embodiments, the pixel circuit columns RC1 and RC2 are configured to emit red light, the pixel circuit columns GC1 and GC2 are configured to emit green light, and the pixel circuit columns BC1 and BC2 are configured to emit blue light. In various embodiments, the pixel circuit columns RC1, GC1, BC1, RC2, GC2 and BC2 may emit light of various colors.

As illustratively shown in FIG. 4, each of the gate lines HG42 and HG43 extends along the X direction, and the gate lines HG42 and HG43 are arranged in order along the Y direction. The transmission line VG42 extends along the Y direction, and is coupled to the gate line HG42. The transmission line VG43 extends along the Y direction, and is coupled to the gate line HG43.

As illustratively shown in FIG. 4, the transmission line VG42 is configured to receive the gate signal SG42, and transmit the gate signal SG42 to the gate line HG42. The transmission line VG43 is configured to receive the gate signal SG43, and transmit the gate signal SG43 to the gate line HG43. The data line LDT4 is configured to receive the data signal DT4.

As illustratively shown in FIG. 4, the data line LDT4 includes data line portions LDP41-LDP44. Along the X direction, each of the data line portions LDP41-LDP44 is located between the pixel circuit columns BC1 and RC2. Each of the data line portions LDP41 and LDP42 extends along the Y direction. Along the X direction, the data line portion LDP41, the transmission lines VG42, VG43 and the data line portion LDP42 are arranged in order.

As illustratively shown in FIG. 4, each of the data line portions LDP43 and LDP44 extends along the Y direction. The data line portion LDP43 is configured to couple a terminal of the data line portion LDP41 to a terminal of the data line portion LDP42, and the data line portion LDP44 is configured to couple another terminal of the data line portion LDP41 to another terminal of the data line portion LDP42. Along the Y direction, the pixel circuit columns RC1, GC1, BC1, RC2, GC2 and BC2 are located between the data line portions LDP43 and LDP44.

Referring to FIG. 4 and FIG. 1, in some embodiments, the data line portions LDP43 and LDP44 are located at the boundary regions 110 and 130, respectively. A terminal of each of the data line portions LDP41 and LDP42 is located at the boundary region 110, and another terminal of each of the data line portions LDP41 and LDP42 is located at the boundary region 130. A length of each of the data line portions LDP41 and LDP42 is longer than the length L11 along the Y direction.

As illustratively shown in FIG. 4, the pixel circuit column BC1 includes pixel circuits B41-B417. Along the Y direction, the pixel circuits B41-B417 are arranged in order. Each of the pixel circuits B41-B417 is coupled to the date line portion LDP41. The pixel circuits B47 and B412 are coupled to the gate lines HG42 and HG43, respectively.

Referring to FIG. 4 and FIG. 2, the display device 400 is an alternative embodiment of the display device 100. The gate line HG42, HG43, the transmission lines VG42, VG43 and the data line LDT4 correspond to the gate line HG2, HG3, the transmission lines VG2, VG3 and the data line LDT1, respectively. The data line portions LDP41-LDP44 correspond to the data line portions LDP1-LDP4, respectively. The gate signals SG42, SG43 and the data signal DT4 correspond to the gate signals SG2, SG3 and the data signal DT1, respectively. The pixel circuits B47 and B412 correspond to the pixel circuits B2 and B3, respectively. Therefore, some descriptions are not repeated for brevity.

Figure 5:
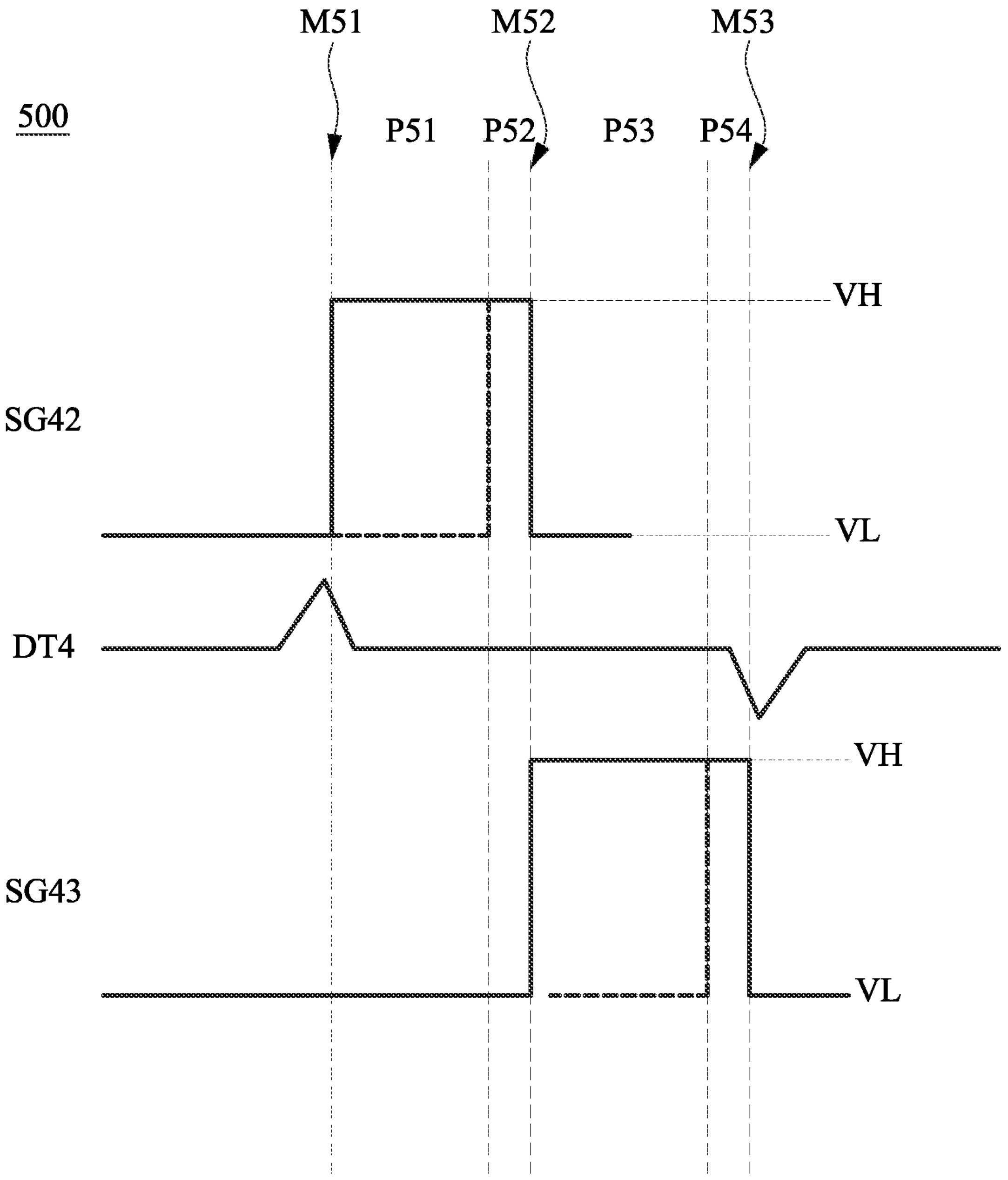
FIG. 5 is a timing diagram of operations of the display device shown in FIG. 4, illustrated according to one embodiment of present disclosure.

FIG. 5 is a timing diagram 500 of operations of the display device 400 shown in FIG. 4, illustrated according to one embodiment of present disclosure. As illustratively shown in FIG. 5, the timing diagram 500 includes periods P51-P54 arranged continuously in order. The period P51 starts at the moment M51. The period P52 ends at the moment M52, and period P53 starts at the moment M52. The period P54 ends at the moment M53.

Before the moment M51, gate lines (not shown in figures) corresponding to the pixel circuits B41-B46 are changed from the voltage level VL to the voltage level VH in order. At the moment M51, the gate line signal SG42 is changed from the voltage level VL to the voltage level VH. In some embodiments, due to the capacitive coupling between the transmission line VG42 and the data line portion LDP41, at the moment M51, the data signal DT4 is pulled high slightly.

During the periods P51-P52, the gate signal SG42 has the voltage level VH. During the period P51, the pixel circuits B43-B46 are charged according to the data signal DT4 in order, and emit light in order. During the period P52, the pixel circuit B47 is charged according to the data signal DT4. In some embodiments, the period P51 is referred to as a pre-charge period of the pixel circuit B47, and the period P52 is referred to as a main-charge period of the pixel circuit B47.

Before the moment M52, gate lines (not shown in figures) corresponding to the pixel circuits B48-B411 are changed from the voltage level VL to the voltage level VH in order. At the moment M52, the gate line signal SG42 is changed from the voltage level VH to the voltage level VL, and the gate line signal SG43 is changed from the voltage level VL to the voltage level VH. At this time, the voltage level of the transmission line VG42 is pulled low by the gate signal SG42, and pulls low the voltage level of the data line portion LDP41 through capacitive coupling. On the other hand, the voltage level of the transmission line VG43 is pulled high by the gate signal SG43, and pulls high the voltage level of the data line portion LDP42 through capacitive coupling. Accordingly, the pulling low of the gate signal SG42 and the pulling high of the gate signal SG43 cancel each other on the data line LDT4, such that the voltage level of the data line LDT4 is maintained. At this time, the voltage level of the pixel circuit B47 coupled to the data line LDT4 is also remains unchanged. After the moment M52, the pixel circuit B47 starts to emit light.

During the periods P53-P54, the gate signal SG43 has the voltage level VH. During the period P53, the pixel circuits B48-B411 are charged according to the data signal DT4 in order, and emit light in order. During the period P54, the pixel circuit B412 is charged according to the data signal DT4. In some embodiments, the period P53 is referred to as a pre-charge period of the pixel circuit B412, and the period P54 is referred to as a main-charge period of the pixel circuit B412.

At the moment M53, the gate line signal SG43 is changed from the voltage level VH to the voltage level VL. In some embodiments, due to the capacitive coupling between the transmission line VG43 and the data line portion LDP42, at the moment M53, the data signal DT4 is pulled low slightly. After the moment M53, the pixel circuit B412 starts to emit light.

Figure 6:
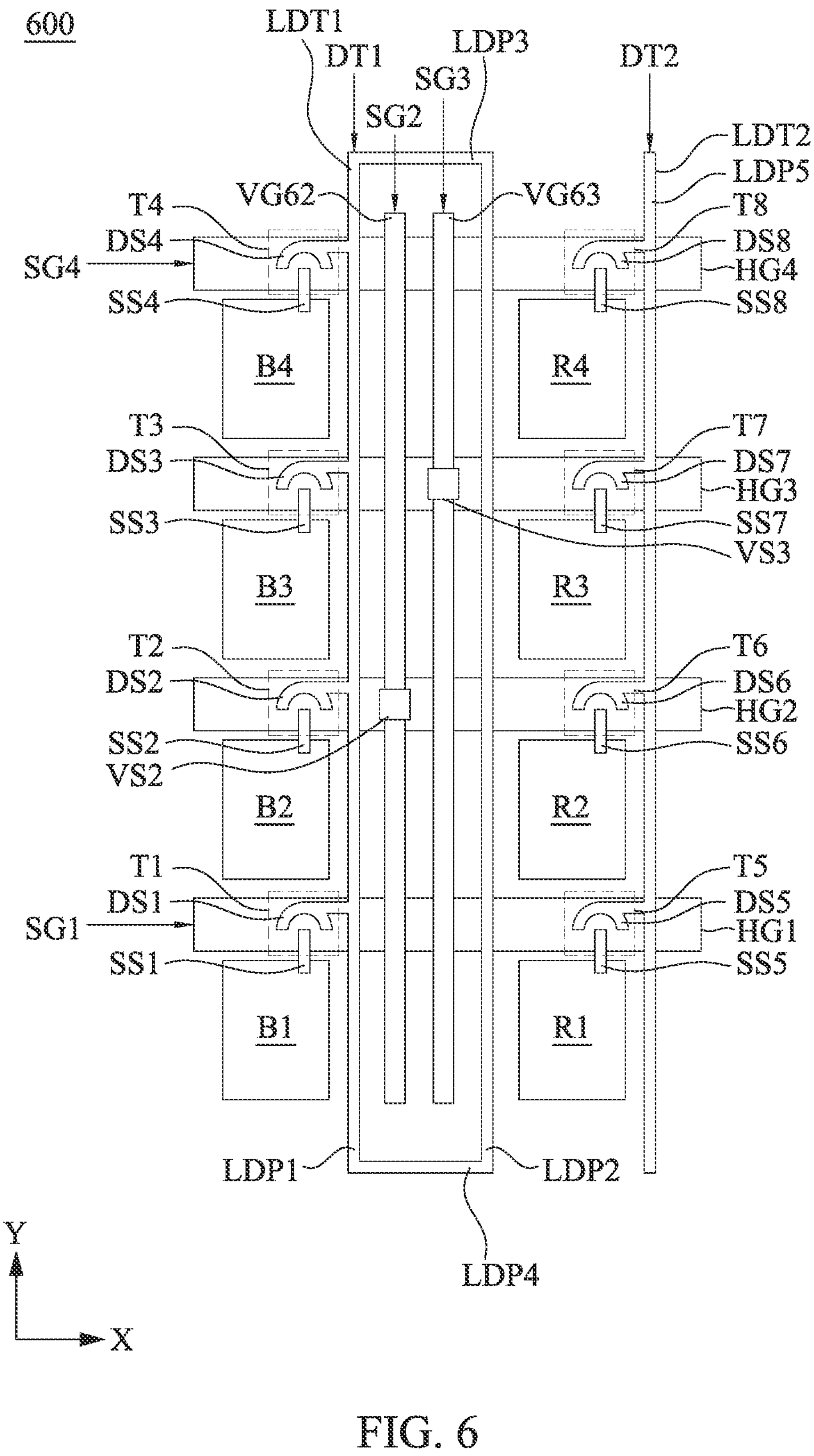
FIG. 6 is a schematic diagram of a display device illustrated according to one embodiment of present disclosure.

FIG. 6 is a schematic diagram of a display device 600 illustrated according to one embodiment of present disclosure. Referring to FIG. 2 and FIG. 6, comparing with the display device 200, the display device 600 includes transmission lines VG62 and VG63 instead of the transmission lines VG2 and VG3. The transmission lines VG62 and VG63 are alternative embodiments of the transmission lines VG2 and VG3, respectively. Therefore, some descriptions are not repeated for brevity.

As illustratively shown in FIG. 6, each of the transmission lines VG62 and VG63 extends along the Y direction and crosses over the gate lines HG1-HG4. The data line portion LDP1, the transmission lines VG62, VG63 and the data line portion LDP2 are arranged in order along the X direction. The transmission line VG62 is configured to transmit the gate signal SG2 to the gate line HG2. The transmission line VG63 is configured to transmit the gate signal SG3 to the gate line HG3.

Referring to FIG. 3 and FIG. 6, in some embodiments, the display device 600 operates according to the timing diagram 300. At the moment M33, the voltage level of the transmission line VG62 is pulled low by the gate signal SG2, and affects the voltage level of the data line portion LDP1 through capacitive coupling. On the other hand, the voltage level of the transmission line VG63 is pulled low by the gate signal SG3, and affects the voltage level of the data line portion LDP2 through capacitive coupling. Accordingly, the pulling low of the gate signal SG2 and the pulling high of the gate signal SG3 cancel each other on the data line LDT1, such that the data line LDT1 is maintained at the voltage level VD2.

In some embodiments, the longer the lengths of the transmission lines VG62 and VG63 are, the larger the capacitive coupling strength between the transmission lines VG62, VG63 and the data line LDT1 are. Accordingly, the transmission lines VG62 and VG63 may affect the data line LDT1 faster, such that the data line LDT1 is maintained at the voltage level VD2 more stable.

Figure 7:
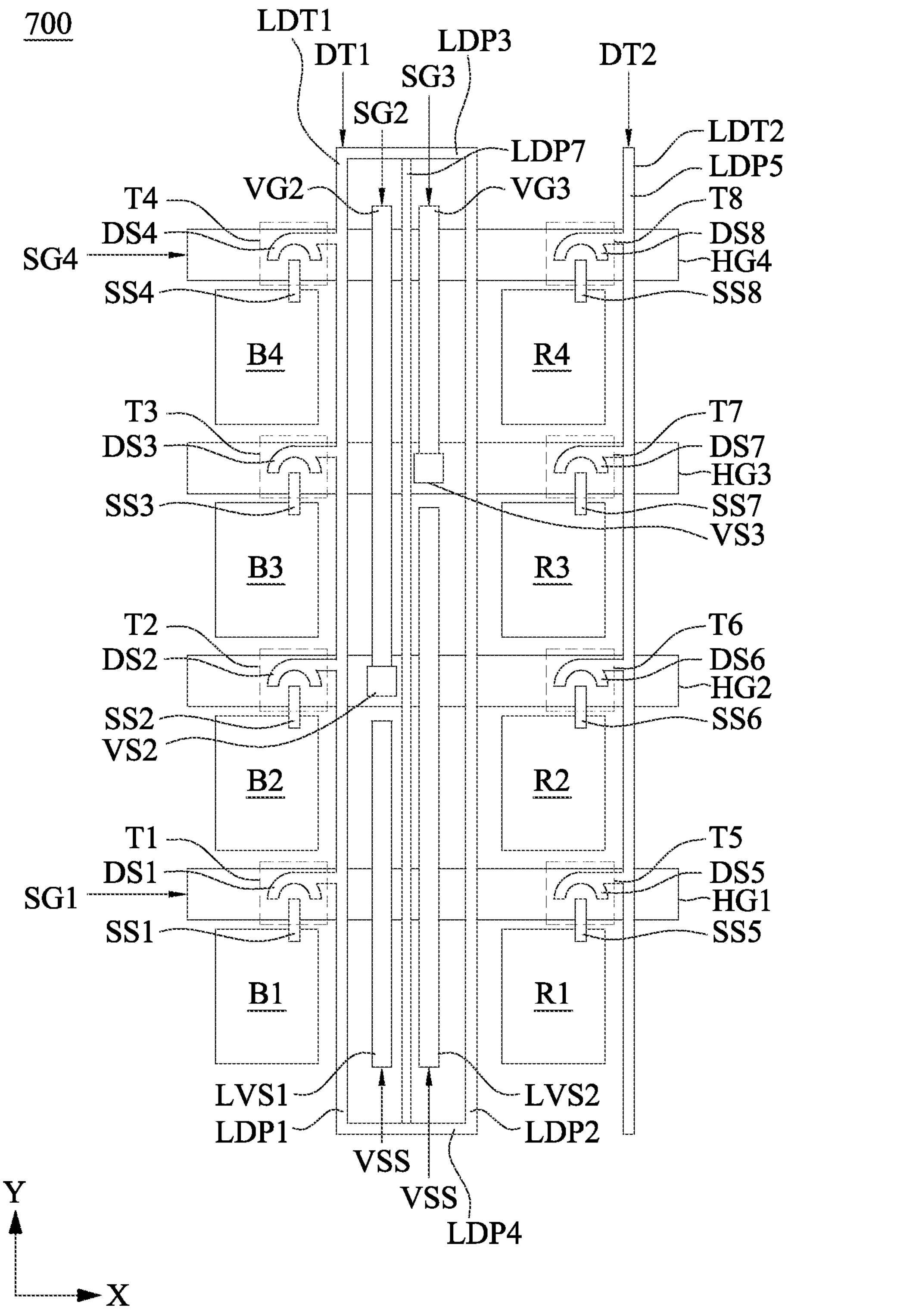
FIG. 7 is a schematic diagram of a display device illustrated according to one embodiment of present disclosure.

FIG. 7 is a schematic diagram of a display device 700 illustrated according to one embodiment of present disclosure. Referring to FIG. 2 and FIG. 7, the display device 700 is an alternative embodiment of the display device 200. Some elements of the display device 700 follow a similar labeling convention to that of the display device 200. For brevity, the discussion will focus more on differences between the display device 700 and the display device 200 than on similarities.

Referring to FIG. 2 and FIG. 7, comparing with the display device 700, the display device 200 further includes a data line portion LDP7. As illustratively shown in FIG. 7, the data line portion LDP7 extends along the Y direction, and crosses over the gate lines HG1-HG4. The data line portion LDP1, the transmission line VG2, the data line portion LDP7, the transmission line VG3, the data line portion LDP2 are arranged in order along the X direction. A terminal of the data line portion LDP7 is coupled to data line portion LDP3, and another terminal of the data line portion LDP7 is coupled to data line portion LDP4. In some embodiments, the data line portion LDP7 is included in the data line LDT1.

In some embodiments, the data line portion LDP7 is capacitive coupled with each of the transmission lines VG2 and VG3. Referring to FIG. 3 and FIG. 7, in some embodiments, the display device 700 operates according to the timing diagram 300. At the moment M33, in response to the gate signal SG2 pulled low, the transmission line VG2 pulls low the voltage level of the data line portion LDP7, and in response to the gate signal SG3 pulled high, the transmission line VG3 pulls high the voltage level of the data line portion LDP7. Accordingly, the pulling low of the gate signal SG2 and the pulling high of the gate signal SG3 cancel each other on the data line portion LDP7, such that the data line LDT1 is maintained.

Figure 8:
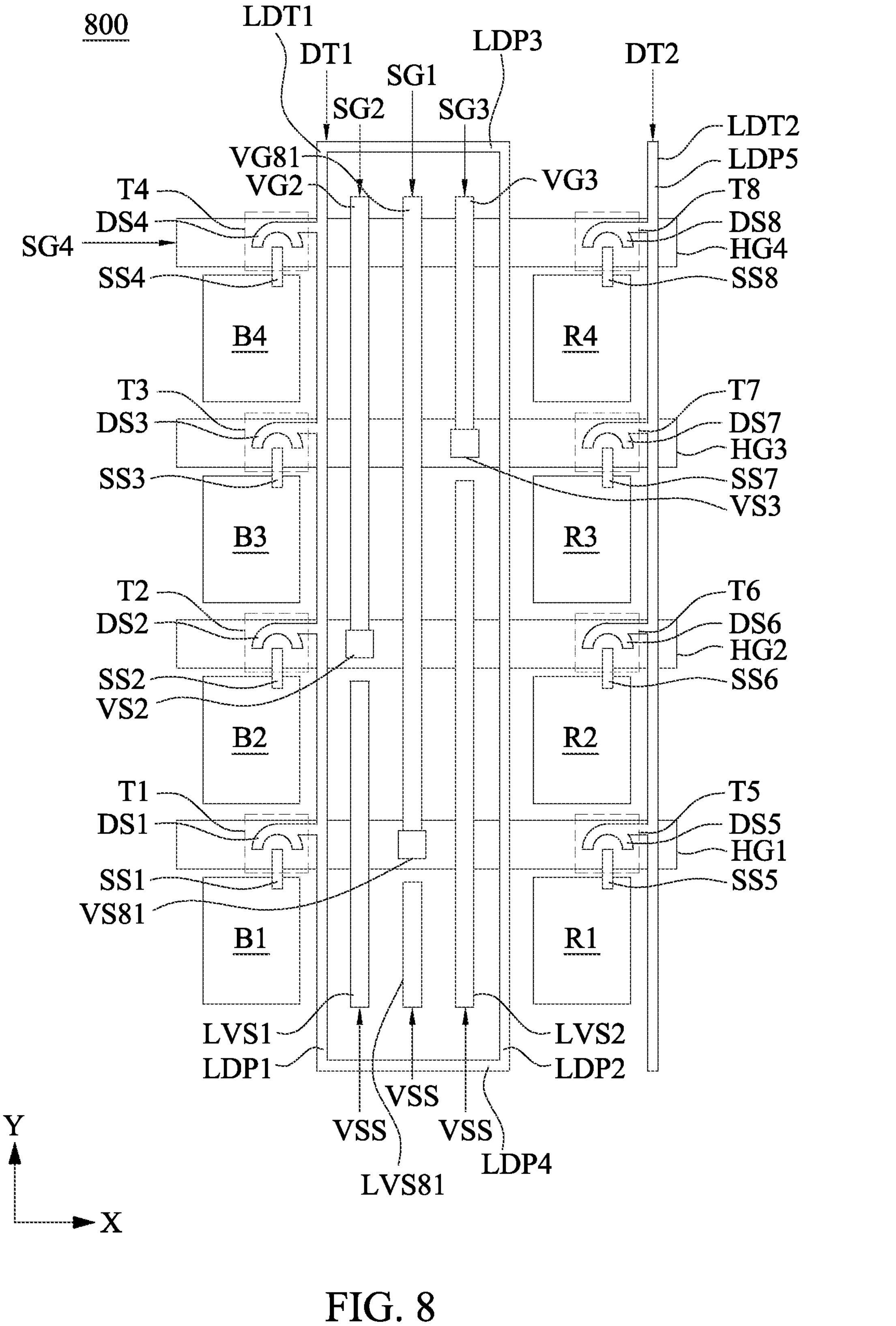
FIG. 8 is a schematic diagram of a display device illustrated according to one embodiment of present disclosure.

FIG. 8 is a schematic diagram of a display device 800 illustrated according to one embodiment of present disclosure. Referring to FIG. 2 and FIG. 8, the display device 800 is an alternative embodiment of the display device 200. Some elements of the display device 800 follow a similar labeling convention to that of the display device 200. For brevity, the discussion will focus more on differences between the display device 800 and the display device 200 than on similarities.

Referring to FIG. 2 and FIG. 8, comparing with the display device 800, the display device 200 further includes a transmission line VG81, a via structure VS81 and a reference voltage line LVS81. As illustratively shown in FIG. 8, the transmission line VG81 extends along the Y direction, and crosses over the gate lines HG2-HG4. Along the X direction, the transmission lines VG2, VG81 and VG3 are arranged in order. The via structure VS81 is located above the gate line HG1, and couples the gate line HG1 to the transmission line VG81. The reference voltage line LVS81 is located between the reference voltage line LVS1 and LVS2.

In some embodiments, the transmission line VG81 is configured to receive the gate line signal SG1, and is configured to transmit the gate signal SG1 through the via structure VS81 to the gate line HG1. The reference voltage line LVS81 is configured to provide the reference voltage signal VSS.

Referring to FIG. 3 and FIG. 8, in some embodiments, the display device 800 operates according to the timing diagram 300. As illustratively shown in FIG. 8, the transmission line VG81 is located between the transmission lines VG2 and VG3. Comparing with the transmission lines VG2 and VG3, distances between the transmission line VG81 and the data lines LDT1, pixel circuits B1-B4, R1-R4 are longer. Accordingly, when the display device 800 operates, the voltage level variation of the transmission line VG81 does not affect the data line LDT1, the pixel circuits B1-B4 and R1-R4.

Referring to FIG. 2 and FIG. 8, the display device 800 may be implemented with a larger size, and the display device 200 may be implemented with a smaller size. For example, the display device 800 corresponds to a screen of 75 inch of 85 inch, and the display device 200 corresponds to a screen of 65 inch.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A display device, comprising:
- a first pixel circuit configured to emit light according to a data signal, and configured to be charged according to a first gate signal;
- a second pixel circuit configured to emit light according to the data signal, and configured to be charged according to a second gate signal;
- a first gate line located between the first pixel circuit and the second pixel circuit, and configured to provide the first gate signal;
- a second gate line configured to provide the second gate signal;
- a first transmission line configured to provide the second gate signal to the second gate line; and
- a second transmission line located between the first transmission line and the second pixel circuit, crossing over the second gate line, and configured to provide the first gate signal to the first gate line.

2. The display device of claim 1, further comprising a data line configured to transmit the data signal, the data line comprising:
- a first data line portion crossing over each of the first gate line and the second gate line; and
- a second data line portion coupled to the first data line portion, and crossing over each of the first gate line and the second gate line,
- wherein the first data line portion, the second transmission line, the first transmission line and the second data line portion are arranged in order.

3. The display device of claim 2, wherein the data line further comprises:
- a third data line portion configured to couple a first terminal of the first data line portion and a first terminal of the second data line portion; and
- a fourth data line portion configured to couple a second terminal of the first data line portion and a second terminal of the second data line portion,
- wherein each of the first gate line and the second gate line is located between the third data line portion and the fourth data line portion.

4. The display device of claim 2, wherein the data line further comprises:
- a third data line portion coupled to the first data line portion and the second data line portion, and located between the first transmission line and the second transmission line.

5. The display device of claim 1, further comprising:
- a third pixel circuit configured to emit light according to the data signal, and configured to be charged according to a third gate signal; and
- a third transmission line located between the first transmission line and the second transmission line, crossing over each of the first gate line and the second gate line, and configured to provide the third gate signal to the third pixel circuit,
- wherein the first pixel circuit is located between the third pixel circuit and the second pixel circuit.

6. The display device of claim 1, wherein the first transmission line crosses over each of the first gate line and the second gate line, and the second transmission line further crosses over the first gate line.

7. An operating method of a display device, comprising:
- at a first moment, adjusting a first gate signal on a first transmission line from a first voltage level to a second voltage level, to maintain a voltage level of a data line capacitive coupled with the first transmission line;

at the first moment, adjusting a second gate signal on a second transmission line from the second voltage level to the first voltage level, to maintain the voltage level of the data line capacitive coupled with the second transmission line;

after the first moment, charging a first pixel circuit according to the second gate signal and a data signal on the data line; and before the first moment, charging a second pixel circuit according to the first gate signal and the data signal.

8. The operating method of claim 7, further comprising:

at the first moment, pulling low a voltage level of a first data line portion of the data line by the first transmission line; and at the first moment, pulling high a voltage level of a second data line portion of the data line by the second transmission line, wherein the first data line portion, the first transmission line, the second transmission line and the second data line portion are arranged in order.

9. The operating method of claim 8, further comprising:

coupling the first data line portion to the second data line portion by a third data line portion of the data line; and coupling the first data line portion to the second data line portion by a fourth data line portion of the data line, wherein each of the first transmission line, the second transmission line, the first pixel circuit and the second pixel circuit is located between the third data line portion and the fourth data line portion.

10. The operating method of claim 7, further comprising:

at the first moment, pulling low a voltage level of a data line portion of the data line by the first transmission line; and at the first moment, pulling high the voltage level of the data line portion of the data line by the second transmission line, wherein the data line portion is located between the first transmission line and the second transmission line.

11. The operating method of claim 7, further comprising:

at a second moment before the first moment, adjusting a third gate signal on a third transmission line from the first voltage level to the second voltage level; and before the second moment, charging a third pixel circuit according to the third gate signal and the data signal, wherein the third transmission line is located between the first transmission line and the second transmission line, and the second pixel circuit is located between the first pixel circuit and the third pixel circuit.

12. The operating method of claim 7, further comprising:

transmitting, by a first gate line, the first gate signal from the first transmission line to the second pixel circuit; and transmitting, by a second gate line, the second gate signal from the second transmission line to the first pixel circuit, wherein each of the first transmission line and the second transmission line crosses over the first gate line and the second gate line.

13. The operating method of claim 12, wherein the second pixel circuit, the first gate line, the first pixel circuit and the second gate line are arranged in order.

14. An operating method of a display device, comprising:

transmitting a data signal to each of a first pixel circuit and a second pixel circuit;

transmitting a first gate signal through a first gate line to the first pixel circuit;

transmitting a second gate signal through a second gate line to the second pixel circuit;

transmitting the second gate signal through a first transmission line to the second gate line; and transmitting the first gate signal through a second transmission line to the first gate line, wherein the first pixel circuit, the first gate line, the second pixel circuit, the second gate line are arranged in order, and the second transmission line is located between the first transmission line and the second pixel circuit, and crosses over the second gate line.

15. The operating method of claim 14, further comprising:

transmitting the data signal through a data line, wherein a first data line portion of the data line crosses over each of the first gate line and the second gate line, a second data line portion of the data line crosses over each of the first gate line and the second gate line, and the first data line portion, the second transmission line, the first transmission line and the second data line portion are arranged in order.

16. The operating method of claim 15, further comprising:

coupling the first data line portion to the second data line portion by a third data line portion of the data line; and coupling the first data line portion to the second data line portion by a fourth data line portion of the data line, wherein each of the first transmission line, the second transmission line, the first pixel circuit and the second pixel circuit is located between the third data line portion and the fourth data line portion.

17. The operating method of claim 16, further comprising:

coupling the third data line portion to the fourth data line portion by a fifth data line portion of the data line, wherein the fifth data line portion is located between the first transmission line and the second transmission line.

18. The operating method of claim 14, further comprising:

transmitting the data signal to a third pixel circuit; and transmitting a third gate signal through a third transmission line to the third pixel circuit;

wherein the third transmission line is located between the first transmission line and the second transmission line, and crosses over each of the first gate line and the second gate line.

19. The operating method of claim 18, wherein the first pixel circuit is located between the third pixel circuit and the second pixel circuit.

20. The operating method of claim 14, wherein the first transmission line crosses over each of the first gate line and the second gate line, and the second transmission line further crosses over the first gate line.

* * * * *